Feb. 3, 1959

C. J. NORTON 2,872,582

CURRENT CONVERTER

Filed Nov. 26, 1957

INVENTOR.
CLYDE J. NORTON,
BY
David Horn
ATTORNEY.

United States Patent Office 2,872,582
Patented Feb. 3, 1959

2,872,582
CURRENT CONVERTER

Clyde J. Norton, Los Angeles, Calif., assignor to Transval Engineering Corporation, Culver City, Calif., a corporation of California Application November 26, 1957, Serial No. 698,977

6 Claims. (Cl. 250—36)

This invention relates generally to converters, and more particularly relates to a system for converting direct into alternating currents.

It is frequently necessary to convert a direct current into an alternating current. Since the voltage of an alternating current may readily be transformed to a higher or lower value, a converter of the type referred to makes it possible to operate electric devices requiring a high operating voltage from a low-voltage, direct-current source such as a battery. To this end various converters have been devised in the art. Such converters of direct current to alternating current usually require a transformer and two switching devices which may consist of electron tubes, transistors or the like. For example, it has been proposed to connect two transistors as switching devices in push-pull. The two emitters may be connected to the positive terminal of the battery while the two collectors are connected across the terminals of the primary winding of a transformer. The mid-point of the transformer may be connected to the negative pole of the battery. If one of the transistors conducts current, a large voltage is built up across the non-conducting transistor. As a result approximately twice the battery voltage is impressed across each transistor in turn. Consequently, the transistors must have a relatively high voltage rating which limits the battery voltage which may be used in this type of circuit. Furthermore, the reliability and life expectancy of the transistors may be impaired by this type of prior art circuit.

It is accordingly an object of the present invention to provide an improved system for converting direct into alternating currents.

Another object of the invention is to provide a converter of the type referred to which permits the use of transistors or other switching devices having either a lower voltage rating, or which may be operated with a voltage below their rated voltage to improve their reliability and life or which permits to utilize a higher battery voltage for the conversion.

A further object of the present invention is to provide a simple and reliable converter of direct into alternating currents which requires a minimum of components.

A system for converting a direct current into an alternating current in accordance with the present invention comprises essentially four separate switching means which may consist of transistors, vacuum tubes, thyratrons and the like and which are controlled in such a manner that the direct current source or battery is connected across an output transformer primary. During one phase of operation, two of the switches connect the battery across the transformer primary. Subsequently, the other two switches close while the first pair of switches open to connect the battery with reversed polarity across the primary winding.

Further in accordance with the present invention the four switching means, such as, for example, four transistors are controlled by a control transformer having a plurality of secondary windings. The secondary windings of the control transformer are utilized to bias one pair of transistors to conduct while at the same time biasing the other pair of transistors to cut off. Therefore, the transistors conduct in pairs to connect the battery across the primary winding of the output transformer with alternately reversed polarity. As a result, an alternating current appears across the secondary winding of the output transformer.

These and other objects of the present invention will become more apparent as the description proceeds, taken in connection with the accompanying drawing, wherein.

Figure 1:
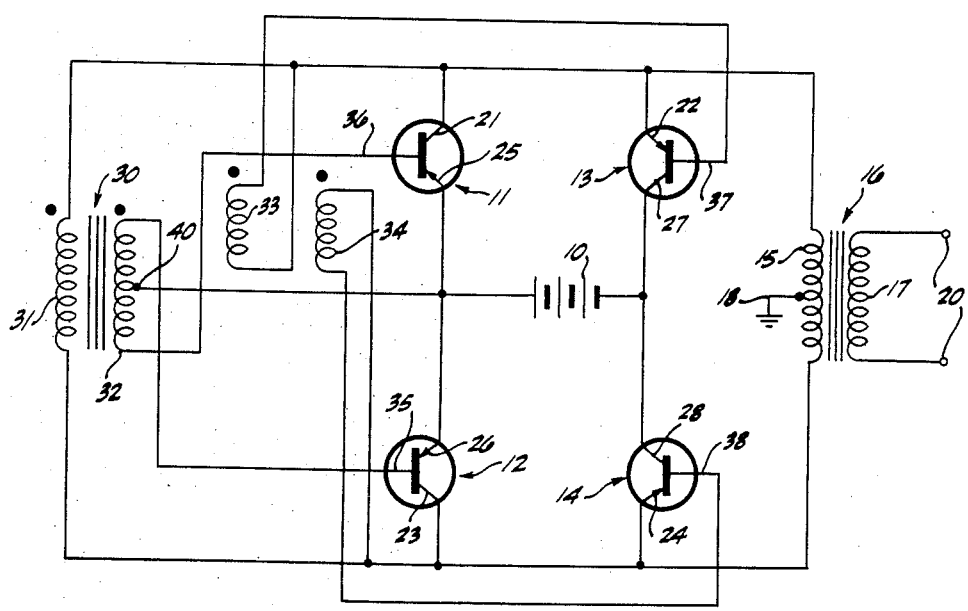
Fig. 1 is a circuit diagram of a converter embodying the present invention.

Referring now to the drawings, wherein like elements are designated by the same reference characters, and more particularly to Fig. 1, there is illustrated a system for converting direct into alternating currents. The converter system includes a source of direct current such as battery 10 and four switching devices such as transistors 11, 12, 13 and 14 for connecting battery 10 across the primary winding 15 of an output transformer 16 having a secondary winding 17. Primary winding 15 may have a tap 18 connected to its mid-point which may be grounded as shown. A pair of output terminals 20 may be connected across the secondary winding 17 to provide an alternating output current.

The four transistors 11, 12, 13 and 14 may be PNP transistors as shown. The four transistors may be junction transistors although it is also feasible to utilize point-contact transistors instead. Each of the four transistors has an emitter, collector and base. Thus, collector 21 of transistor 11 and emitter 22 of transistor 13 are connected together and to one terminal of primary winding 15. Similarly collector 23 of transistor 12 is directly connected to emitter 24 of transistor 14 and to the other terminal of transformer primary winding 15. Furthermore, emitter 25 of transistor 11 is directly connected to emitter 26 of transistor 12 and to the positive terminal of battery 10. Similarly, the collector 27 of transistor 13 and the collector 28 of transistor 14 are both connected to the negative terminal of battery 10.

The conduction of the four transistors is controlled in accordance with the present invention by means of a control transformer 30 having a primary winding 31, a first secondary winding 32 and two auxiliary windings 33 and 34. The four windings 31 to 34 of transformer 30 are poled as indicated by the dots. Primary winding 31 is connected across primary winding 15 of output transformer 16. The upper terminal of secondary winding 32 is connected to base 35 of transistor 12 while the lower terminal of the secondary control winding is connected to base 36 of transistor 11. The auxiliary winding 33 is connected between the junction point of collector 21 and emitter 22 and the base 37 of transistor 13. Similarly auxiliary winding 34 is connected between the junction point of collector 23 and emitter 24 and the base 38 of transistor 14. The center tap 40 of secondary winding 32 is connected to the positive terminal of battery 10.

It may be mentioned here that control transformer 30 preferably has a core with a sharp saturating characteristic. In other words, the core of transformer 30 should have a substantially square hysteresis loop. The auxiliary windings 33 and 34 each have the same number of turns which is preferably one half of that of secondary winding 32. Output transformer 16 is a power transformer with a winding ratio to provide the desired output voltage depending on the voltage of battery 10.

Obviously, transistors 11 to 14 may also be NPN transistors in which case the voltages applied to the transistors should be reversed as is well known in the art.

The operation of the converter of Fig. 1 may be explained as follows: Assuming the circuit of Fig. 1 is put in operation in any suitable manner, for example by closing a switch (not shown) in the circuit of battery 10. Assuming further that transistors 11 and 14 conduct current initially. In that case current will flow from the positive pole of battery 10 through emitter 25, collector 21, primary winding 31, and then through emitter 24 and collector 28 of transistor 14 back to the negative pole of battery 10. Furthermore, a current will also flow through the primary winding 15 of output transformer 16.

The flow of current through primary winding 31 will induce voltages in secondary windings 32, 33 and 34 which will at this time render the terminals marked with the dots positive with respect to their other terminals. Accordingly base 36 will be negative with respect to emitter 25 of transistor 11 since the base 36 is connected to the lower or negative terminal of winding 32 while emitter 25 is connected to the positive pole of battery 10 and the center tap 40 of winding 32. As a result, transistor 11 which is a PNP transistor is biased in the conducting direction. At the same time base 35 will be positive with respect to the emitter 26 of transistor 12 due to the voltage induced in winding 32. Consequently transistor 12 is biased to cut off.

Similarly base 38 is negative with respect to emitter 24 of transistor 14 since the base is connected to the negative terminal of auxiliary winding 34, the positive terminal thereof being connected to emitter 24. It will now be obvious that transistor 14 is biased in such a manner as to conduct current. At the same time base 37 is positive with respect to emitter 22 of transistor 13 by virtue of its connection to auxiliary winding 33. This results in transistor 13 being biased to cut off.

Accordingly, transistors 11 and 14 are initially conducting current while transistors 12 and 13 are cut off. However, after a predetermined period of time transformer 30 begins to saturate with the result that less voltage is developed thereacross. Consequently, in view of the reduced voltage now applied to the transistors 11 and 14, less current is permitted to flow through the conducting transistors and the voltage across the primary winding 15 of the output transformer begins to diminish. Obviously, the voltage across the primary winding 31 of the control transformer 30 also is reduced and hence the current flow through transistors 11 and 14 is rapidly cut off.

Eventually the voltages across the secondary windings 32, 33 and 34 will reverse and as a result transistors 12 and 13 will now conduct current while transistors 11 and 14 are cut off. Thus the reversal of the voltages across secondary winding 32 causes a negative potential to appear at base 35 with respect to that of emitter 23, thus biasing transistor 12 to conduct. At the same time a positive potential appears at the base 36 with respect to that of emitter 25 which cuts off transistor 11. Simultaneously the voltages across the auxiliary windings 33 and 34 reverse. As a result, a positive voltage appears at base 38 with respect to that of emitter 24 to cut off transistor 14 while a negative voltage is impressed on base 37 relative to that of emitter 22 to permit transistor 13 to conduct.

Therefore, transistors 11 and 14 are now cut off while transistors 12 and 13 conduct current. The current flow may now be traced from the positive pole of battery 10 through emitter 26, collector 23, transformer primary winding 31, emitter 22, collector 27 and back to the negative pole of battery 10. Current now flows through primary winding 31 and hence through primary winding 15 in the reverse direction.

This action repeats again thus causing an alternating current to flow through primary winding 15.

It will now be seen that control transformer 30 controls the bias voltages applied to the four transistors and causes them to conduct in pairs and alternately. It will be observed that the voltage appearing across the nonconducting transistors such as 12 and 13, for example, is approximately the battery voltage. In other words, when transistor 14 conducts, the battery voltage appears across emitter 26 and collector 23 less the voltage drop across transistor 14. Similarly when transistor 11 conducts, the voltage of battery 10 less the voltage drop across transistor 11 appears between emitter 22 and collector 27.

Figure 2:
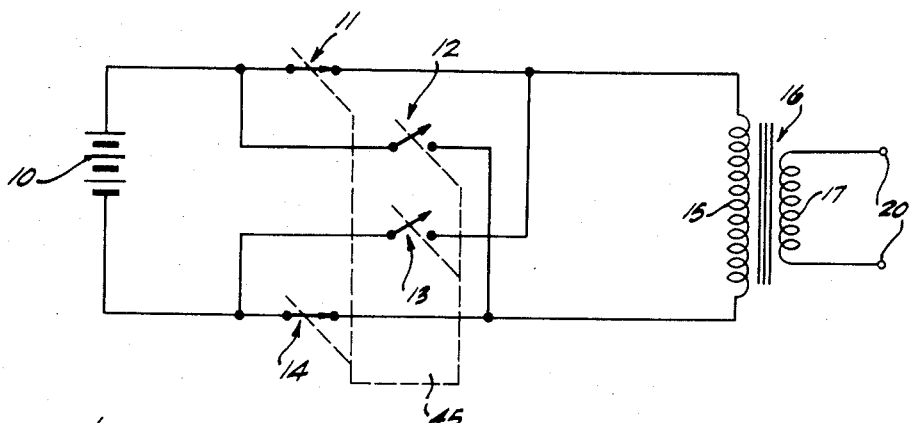
Fig. 2 is an equivalent circuit diagram of the converter of Fig. 1.

Fig. 2 to which reference is now made, illustrates an equivalent circuit of the converter of Fig. 1. Primary winding 15 of output transformer 16 is connected across battery 10 by switches 11 and 14 corresponding to the respective transistors of the same reference numbers of Fig. 1. By means of the unicontrol means illustrated schematically by the dotted lines 45, switches 11 and 14 are closed in unison. At some later time by virtue of unicontrol means 45, switches 11, 14 are opened while switches 12, 13 are closed whereby battery 10 is again connected across output primary 15 with reversed polarity. The unicontrol means 45 is represented in Fig. 1 by the control transformer 30 which controls the conduction of the four switching transistors.

From the equivalent circuit of Fig. 2 it will be evident that instead of transistors, other switching means such as vacuum tubes or thyratrons and the like may be used. All that is necessary is to provide means for controlling the four switches alternately and in pairs in the manner discussed above.

Since the voltage across each of the transistors is never more than approximately the battery voltage, it is possible to utilize transistors in the converter of the invention having half the voltage rating of those necessary in prior art circuits. Alternatively, it is feasible to use transistors having a high voltage rating so that they may be operated at a voltage below their rated voltage with a resulting increase in reliability and life expectancy of the transistors. Finally, it is feasible to use twice the battery voltage of that possible with prior art circuits.

There has thus been disclosed any improved system for converting direct into alternating currents. The converter of the invention is relatively simple and requires a minimum of parts. The switching elements used in the system are exposed to voltages which substantially do not exceed that of the direct current source to be converted.

What is claimed is:

1. A system for converting direct current into alternating current comprising a transformer having a primary and a secondary winding, a first and a second input terminal adapted to have a direct current impressed thereon, first switching means for selectively directly connecting said first input terminal to a first terminal of said primary winding, second switching means for selectively directly connecting said second input terminal to the second terminal of said primary winding, third switching means for selectively directly connecting said second input terminal to said first terminal of said primary winding, fourth switching means for selectively directly connecting said first input terminal to said second terminal of said primary winding, and control means coupled to said transformer and to said switching means for alternately and cyclically closing in unison said first and second switching means and for closing in unison said third and fourth switching means, whereby an alternating current is developed across said secondary winding in response to the application of a direct current to said input terminals.

2. A current converter for converting direct current into alternating current comprising an output transformer having a primary and a secondary winding, first and second input terminals adapted to have a direct current impressed thereon, first switching means for selectively connecting said first input terminal to a first terminal of said primary winding, second switching means for selectively connecting said second input terminal to the second terminal of said primary winding, third switching means for selectively connecting said second input terminal to said first terminal of said primary winding, fourth switching means for selectively connecting said first input terminal to said second terminal of said primary winding, and control transformer means coupled to said output transformer and to said switching means for closing in unison said first and second switching means and for alternately and cyclically closing thereafter said third and fourth switching means, whereby an alternating current is developed across said secondary winding in response to the application of direct current to said input terminals.

3. A system for converting direct current into alternating current comprising an output transformer having a primary winding, first and second input terminals adapted to have a direct current impressed thereon, first, second, third and fourth electronic switching means, said first and second switching means selectively connecting said input terminals to said primary winding to cause current flow through said primary winding in one direction in response to the application of a direct current to said input terminals, said third and fourth switching means selectively connecting said input terminals to said primary winding to cause current flow through said primary winding in the opposite direction in response to the application of said direct current, and a control transformer having a primary winding connected in parallel to said primary winding of said output transformer, and a plurality of secondary windings, said secondary windings being coupled to said switching means in such a manner as to cause said first and second switching means to close in unison and thereafter to close said third and fourth switching means during periodically recurring time intervals.

4. A system as defined in claim 3 wherein said switching means comprise transistors.

5. A direct current to alternating current converter comprising an output transformer having a primary winding and a secondary winding, first and second input terminals adapted to have a direct current impressed thereon, output terminals connected to said secondary winding for deriving the converted alternating output current, a first, second, third and fourth transistor, each having an input electrode, an output electrode, and a control electrode, and a control transformer having a primary winding, a secondary winding and first and second auxiliary windings, said primary windings being connected in parallel, the input and output electrodes of said first and third transistor being connected serially between said first input terminal, a first common terminal of said primary windings and said second input terminal to provide a first current conducting loop, the input and output electrodes of said second and fourth transistor being connected serially between said first input terminal, the second common terminal of said primary windings and said second input terminal to provide a second current conducting loop, a midpoint of said secondary winding of said control transformer being connected to said first input terminal, the terminals of said secondary winding of said control transformer being connected to the control electrodes of said first and second transistor, the terminals of said first auxiliary winding being connected between said first common terminal and the control electrode of said third transistor, the terminals of said second auxiliary winding being connected between said second common terminal and the control electrode of said fourth transistors, said secondary winding and auxiliary windings of said control transformer being poled to cause at one time said first and fourth transistor to be biased to conduct and said second and third transistor to be cut off and vice versa.

6. A direct current to alternating current converter comprising an output transformer having a primary winding and a secondary winding, first and second input terminals adapted to have a direct current impressed thereon, output terminals connected to said secondary winding for deriving the converted alternating output current, a first, second, third and fourth transistor, each having an emitter, collector and base, and a control transformer having a primary winding, a secondary winding and first and second auxiliary windings, said primary windings being connected in parallel, the emitters of said first and second transistor being connected to said first input terminal and to a midpoint of said secondary winding of said control transformer, the collectors of said third and fourth transistor being connected to said second input terminal, the collector of said first transistor and the emitter of said third transistor being connected to one common terminal of said primary windings, the collector of said second transistor and the emitter of said fourth transistor being connected to the other common terminal of said primary windings, the terminals of said secondary winding of said control transistor being connected between the bases of said first and second transistor, the terminals of said first auxiliary winding being connected between said one common terminal and the base of said third transistor, the terminals of said second auxiliary winding being connected between said other common terminal and the base of said fourth transistor, said secondary and auxiliary windings of said control transformer being poled so as to bias at one time said first and fourth transistor to conduct and simultaneously to bias said second and third transistor to cut off while biasing at another time said first and fourth transistor to cut off and biasing said second and third transistor to conduct.

References Cited in the file of this patent
UNITED STATES PATENTS
2,798,160    Bruck et al. _____ July 2, 1957